M. CRENSHAW.
Rotary-Harrow.
No. 14,533.
Patented Mar. 25, 1856.
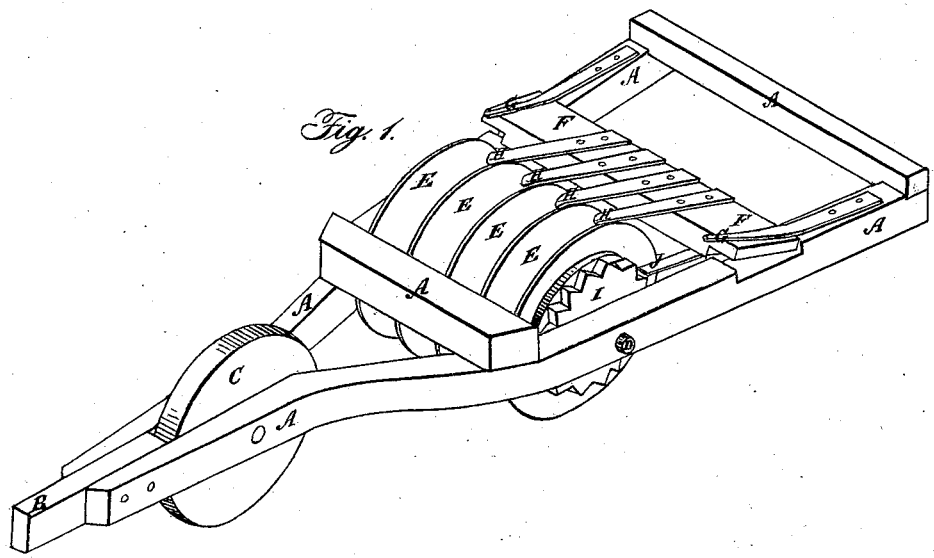
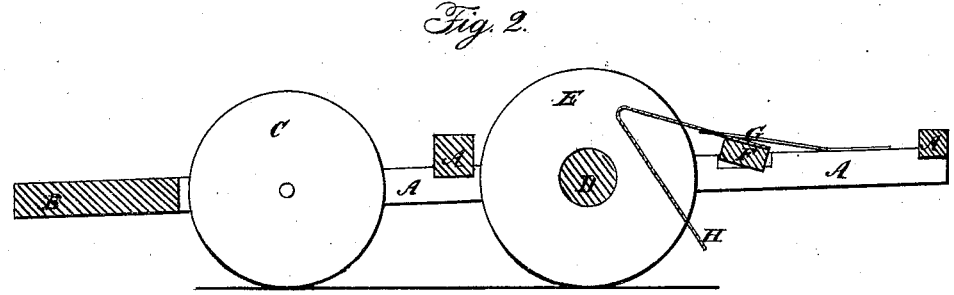

UNITED STATES PATENT OFFICE.

MICAJAH CRENSHAW, OF SPRINGFIELD, TEXAS.

IMPROVED CULTIVATING-PLOW.

Specification forming part of Letters Patent No. 14,533, dated March 25, 1856.

*To all whom it may concern:*

Be it known that I, MICAJAH CRENSHAW, of Springfield, in the county of Limestone and State of Texas, have invented certain new and useful Improvements in Cultivating-Plows; and I do hereby declare the following to be a full, clear, and exact description of the same, reference being had to the accompanying drawings, in which—

Figure 1 represents a perspective view, and Fig. 2 represents a longitudinal vertical section through the plow.

Similar letters in the separate figures denote like parts in both.

The nature of my invention relates to the manner in which I have combined a series of cutting-disks with a series of digging-hoes, for the purpose of forming a cultivating-plow.

To enable others skilled in the art to make and use my invention, I will proceed to describe the same with reference to the drawings.

A represents the stock or frame of the plow, so made as to expand in rear and come together in front, like a pair of hounds, to embrace the tongue B, by which the plow is guided.

C is a guiding and supporting wheel for the front end of the plow. At about midway of the frame is arranged upon a shaft, D, a series of cutting or scoring disks, E, and behind these, upon a stock, F, held down by springs G, are a series of digging-hoes, H, so bent under and backward as to readily surmount any opposing obstacle that might otherwise obstruct or break said hoes.

On one or both ends of the shaft D (one only being shown in the drawings) is placed a cam-wheel, I, upon which rests an arm, J, permanently attached to the stock F, so that the rotation of said cam-wheel with the shaft D will cause the stock F to rise up with its hoes against the action of the springs G, and when the cams pass from under the arm J the springs will throw down and under the hoes H with a motion precisely similar to that of hand-hoeing and dig up the lands previously sliced by the disks E.

Should it be desirable to arrange a great number of hoes in the series, and to avoid the raising and dropping of the whole series at once, it may readily be done by hanging the hoes separately on a shaft or rod, and having a spring to control each separate hoe. Then by a shaft with a series of arms like J, but set spirally around said shaft, the hoes may be raised and thrown down separately, instead of *en masse*, which would give more regularity to the machine; and if found desirable two or more of the series of disks or hoes may be used, placed before or behind each other, or a gang of plows may be used in connection with the disks and the vibrating hoes, if found desirable, the object being to slice and dig up the soil for planting or sowing with ease to the team and expedition.

The hoes may work close in between the disks, so that if said disks should mount over a root or stone, they shall also raise up the hoes with them to prevent them from striking against anything likely to injure them. The rear inclination of the hoes will prevent them from striking under anything so as to be caught and held as they return in the direction in which they entered.

Having thus fully described the nature of my invention, I would state that I am aware rotating hoes have been used in connection with plows and cultivators in various forms. This I do not claim; but

What I do claim as new, and desire to secure by Letters Patent, is—

In combination with the series of cutting plates or disks, the series of reciprocating hoes, when the hoes are so arranged as to work in lines parallel with the cutters or disks, and so inclined downward and rearward as to readily rise up over any obstructions without danger of clogging or choking, as set forth.

MICAJAH CRENSHAW.

Witnesses:
   THOS. H. UPPERMAN,
   E. COHEN.